(12) United States Patent  
Winkler

(10) Patent No.: US 7,564,374 B2
(45) Date of Patent: Jul. 21, 2009

(54) METHOD AND DEVICE FOR ASSISTING IN THE PILOTING OF AN AIRCRAFT

(75) Inventor: Falk Winkler, Cintegabelle (FR)

(73) Assignee: AIRBUS France, Toulouse (FR)

(*) Notice: Subject to any disclaimer, the term of this patent is extended or adjusted under 35 U.S.C. 154(b) by 291 days.

(21) Appl. No.: 11/648,912

(22) Filed: Jan. 3, 2007

(65) Prior Publication Data

US 2007/0222643 A1 Sep. 27, 2007

(30) Foreign Application Priority Data

Jan. 5, 2006 (FR) ................................. 06 00069

(51) Int. Cl.
  *G01C 21/00* (2006.01)

(52) U.S. Cl. ..................................................... 340/971
(58) Field of Classification Search ................. 340/971, 340/967, 970, 977; 701/301, 3, 7, 18
See application file for complete search history.

(56) References Cited

U.S. PATENT DOCUMENTS

| 5,445,021 | A  | * | 8/1995  | Cattoen et al. ............. 73/178 R |
| 6,112,141 | A  | * | 8/2000  | Briffe et al. ................... 701/14 |
| 6,720,891 | B2 | * | 4/2004  | Chen et al. .................. 340/969 |
| 2002/0143439 | A1 | * | 10/2002 | Morizet et al. ................ 701/3 |
| 2003/0193410 | A1 |   | 10/2003 | Chen et al. |
| 2006/0250280 | A1 | * | 11/2006 | Chen et al. .................. 340/974 |

FOREIGN PATENT DOCUMENTS

FR  2689231  10/1993
FR  2822944  10/2002

OTHER PUBLICATIONS

Preliminary Search Report dated Dec. 20, 2006 with English translation.

* cited by examiner

*Primary Examiner*—Phung Nguyen
(74) *Attorney, Agent, or Firm*—Dickinson Wright, PLLC

(57) ABSTRACT

A device to assist in the piloting of an aircraft includes a display unit to present, in a display window of a screen, an information presentation illustrating a vertical plane along a flight path which represents a flight plan and which is formed so as to position the display window altitude-wise, and to further position a symbol illustrating the aircraft vertically in the display window, where the positioning of the display window and the symbol are based on the current flight phase, the current altitude and an altitude relative to the flight path.

9 Claims, 3 Drawing Sheets

METHOD AND DEVICE FOR ASSISTING IN THE PILOTING OF AN AIRCRAFT

FIELD OF THE INVENTION

Figure 1:
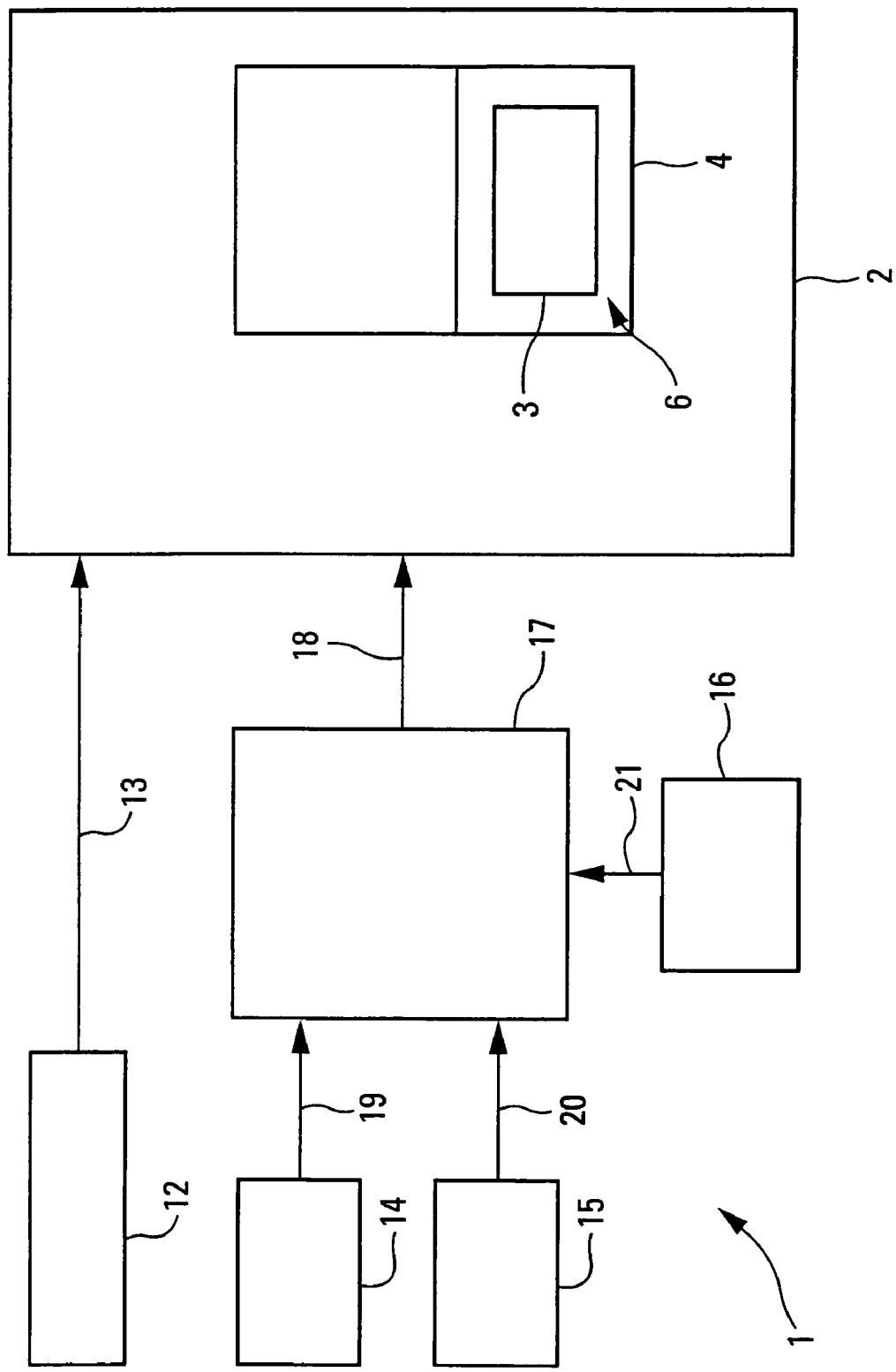

The present invention relates to a method and a device for assisting in the piloting of an aircraft, in particular of a military transport airplane.

BACKGROUND OF THE RELATED ART

Patents FR-2 689 231 and FR-2 822 944 disclose methods for assisting in piloting, according to which there is presented, on a display screen of said aircraft, an information presentation which illustrates a vertical plane along a flight path representative of a predetermined flight plan of said aircraft and which comprises:
a system of axes, of which a y-axis is graduated altitude-wise, and an x-axis is graduated distance-wise from the position of the aircraft;
a characteristic symbol representing the aircraft, which is positioned on said y-axis in a position representative of the altitude of said aircraft; and
at least one first trace representing the vertical path of said flight path, and a second trace representing the profile of the ground being flown over.

Such a known method is above all used in the civilian domain.

It is known that a civilian flight as performed in the civilian domain has a particular profile (or a series of phases), namely a climb to a maximum cruising altitude (which is sometimes reached in a number of stages), a flight at that altitude, then a descent to the destination altitude. Thus, once the climb has begun, it is continued to the maximum cruising altitude. Similarly, once the descent has begun, it is continued to the destination, and without an intermediate climb being required during this descent. Such a civilian flight therefore has long climb and descent phases. Generally, the positioning of the abovementioned particular symbol (representing the aircraft) on the y-axis of said system of axes is achieved according to either the selected altitude or the destination altitude.

It will be noted that the present invention is applied more particularly, although not exclusively, to a tactical flight, that is a flight made generally in the military domain and which includes at least one tactical event such as an in-flight refueling, an initially unplanned landing, a jettisoning or a parachuting of troops and/or of equipment, for example. Such a tactical flight has a profile that overall can include several high-altitude flight phases and several low-altitude flight phases. A typical profile of such a tactical flight can, for example, include the following phases: a take-off phase with a climb, a transit to high altitude, a rapid descent to a low-altitude flight zone likely to be dangerous, and in which a tactical event can be performed, such as a jettisoning, for example, then a repeat transit to high altitude, for example to perform an in-flight refueling, and finally a descent to the final destination.

Such a profile therefore includes not only long climb and descent phases, like a civilian profile, but also automatic ground-following paths resulting in short climbs and descents, and including connecting phases between a descent and a flight at low altitude or between a flight at low altitude and a climb.

Because of these latter characteristics, the usual abovementioned information presentation (relating to the vertical plane along the flight plan of the aircraft), which is well suited to a civilian flight, is not totally satisfactory for a tactical flight. In practice, using this usual information presentation as such risks showing up jumps in the position both of the display window and (above all) of said particular symbol representing the aircraft, in transitions from one flight phase to another. Also, with such a usual information presentation, it will be very difficult for the pilot to effectively monitor the future path in all the flight phases likely to be followed by the aircraft.

SUMMARY OF THE INVENTION

The present invention relates to a method for assisting the piloting of an aircraft, in particular of a military transport airplane, which makes it possible to overcome the abovementioned drawbacks.

To this end, said method wherein there is presented, on at least one display window of at least one display screen of said aircraft, an information presentation which illustrates a vertical plane along a flight path which is representative of a predetermined flight plan of said aircraft and which comprises:
a system of axes, of which a y-axis is graduated altitude-wise, and an x-axis is graduated distance-wise from the position of the aircraft;
a characteristic symbol representing the aircraft, which is positioned on said y-axis in a position representative of the altitude of said aircraft;
a first trace representing the vertical path of said flight path; and
a second trace representing the profile of the ground being flown over and revealing a vertical section, is noteworthy, according to the invention, in that, during a flight of the aircraft, the following series of successive steps is carried out automatically and repeatedly:
a) the current flight phase of the aircraft is determined;
b) a first altitude corresponding to the current altitude of the aircraft is determined;
c) a second altitude corresponding to the average value of the altitude of a portion of said flight path is calculated, said portion starting at the current position of the aircraft and corresponding to the maximum portion that can be displayed in said display window as a function of the size of said display window and of its scale;
d) based on said current flight phase and said first and second altitudes, there are determined:
a reference height corresponding to a height of said characteristic symbol in said display window; and
a reference altitude corresponding to the altitude of the lowest point of the vertical section displayed; and
e) the following are positioned:
said display window, altitude-wise such that the lowest point of the vertical section displayed in said display window is located at said reference altitude on said y-axis graduated altitude-wise; and
said characteristic symbol, vertically in said display window at a height corresponding to said reference height.

Thus, with the invention, the positioning altitude-wise of the display window, and the positioning of the characteristic symbol representing the aircraft in this display window depend on the current flight phase and on said first and second aforementioned altitudes. Consequently, as specified below, said information presentation always shows the space that is located in the direction in which the aircraft is flying, which has the particular advantage of never losing the monitoring of the ground in transitional phases, between a climb and a descent for example. The present invention thus makes it possible to optimize the monitoring of the upcoming flight path, and this regardless of the flight phase of the aircraft. Furthermore, the transitions from one phase to another are continuous, with no jump in the position either of the display window, or (above all) of said characteristic symbol.

In a preferred embodiment, in a flight phase corresponding to one of the following phases: an approach phase, a go-around phase, and a low-altitude flight phase, in the step d):

d1) said first and second altitudes are compared; and
d2) as a function of this comparison:

if said first altitude ALTac is greater than said second altitude ALTmoy, there are determined:
    as reference height, the minimum value between Z1 and Z0/2+C(ALTac−ALTmoy), Z0 being the useful height of the display window, Z1 being the difference between said useful height and the height of an upper area of exclusion from display of said characteristic symbol in said display window, and C being a coefficient; and
    as reference altitude:
        an altitude ALTref satisfying the relation ALTref=ALTmoy−Z0/2, if ALTac−ALTmoy is less than a predetermined value, preferably 320/8; and
        an altitude ALTref satisfying the relation ALTref=ALTac−Z1, if ALTac−ALTmoy is greater than or equal to said predetermined value;

if said first altitude ALTac is less than or equal to said second altitude ALTmoy, there are determined:
    as reference height, the maximum value between Z2 and Z0/2−C(ALTmoy−ALTac), Z2 being the height of a lower area of exclusion from display of said characteristic symbol in said display window; and
    as reference altitude:
        an altitude ALTref satisfying the relation ALTref=ALTmoy−Z0/2, if ALTac−ALTmoy is less than or equal to the aforementioned predetermined value, preferably 320/8; and
        an altitude ALTref satisfying the relation ALTref=ALTac−Z2, if ALTac−ALTmoy is greater than or equal to said predetermined value.

In this preferred embodiment, in a first simplified variant, said coefficient C is equal to 1. This makes it possible in particular to obtain a very simple method of calculation.

Furthermore, in a second variant, said coefficient C is different than 1. Thus, the characteristic symbol is offset by a value proportional to the difference between said first and second altitudes, which makes it possible in particular to smooth out the positional variations of said characteristic symbol, so that they are less rapid, or even less violent, especially during the transition from stable phases (such as a cruise phase, or a low-altitude flight with little relief) to prolonged descent or climb phases. More precisely, if C is less than 1, it is therefore possible to smooth out and reduce said positional variations of the characteristic symbol. However, if C is greater than 1, these positional variations are rendered more reactive to the path variations.

Moreover, advantageously, in a flight phase corresponding to one of the following phases: a take-off phase, a climbing phase and a pre-flight phase, there are determined in step d):
as reference height, a height Z2 which corresponds to the height of a lower area of exclusion from display of said characteristic symbol in said display window; and
as reference altitude, an altitude ALTref satisfying the relation ALTref=ALTac−Z2, ALTac being said first altitude.

Furthermore, advantageously, in a flight phase corresponding to a descent phase, there are determined in step d):
as reference height, the difference Z1 between a useful height of the display window and the height of an upper area of exclusion from display of said characteristic symbol in said display window; and
as reference altitude, an altitude ALTref satisfying the relation ALTref=ALTac−Z1, ALTac being said first altitude.

It will be noted that, preferably:
Z1=7 Z0/8; and
Z2=Z0/8.

The present invention also relates to a device for assisting in the piloting of an aircraft, in particular of a military transport airplane.

According to the invention, said device of the type comprising display means that can show, on at least one display window of at least one display screen of said aircraft, an information presentation which illustrates a vertical plane along a flight path which is representative of a predetermined flight plan of said aircraft and which comprises:
a system of axes, of which a y-axis is graduated altitude-wise, and an x-axis is graduated distance-wise from the position of the aircraft;
a characteristic symbol representing the aircraft, which is placed on said y-axis in a position representative of the altitude of said aircraft;
a first trace representing the vertical path of said flight path; and
a second trace representing the profile of the ground being flown over and revealing a vertical section, is noteworthy in that:
said device also comprises:
    a first means for determining the current flight phase of the aircraft;
    a second means for determining a first altitude corresponding to the current altitude of the aircraft;
    a third means for calculating a second altitude corresponding to the average value of the altitude of a portion of said flight path, said portion starting at the current position of the aircraft and corresponding to the maximum portion that can be displayed in said display window as a function of the size of said display window and of its scale; and
    a fourth means for determining, from said current flight phase and said first and second altitudes:
        a reference height corresponding to a height of said characteristic symbol in said display window; and
        a reference altitude corresponding to the altitude of the lowest point of the vertical section displayed; and
said display means are formed so as to position:
    said display window altitude-wise such that the lowest point of the vertical section displayed in said display window is located at said reference altitude on said y-axis graduated altitude-wise; and
    said characteristic symbol vertically in said display window at a height corresponding to said reference height.

Thus, said device according to the invention makes it possible to avoid any discontinuity in the position of said characteristic symbol and in that of said display window. In addition, it makes it possible to optimize the length of a flight path (for example at low altitude) that can be displayed before leaving said display window.

BRIEF DECRIPTION OF THE DRAWINGS

The figures of the appended drawing will clearly show how the invention can be implemented. In these figures, identical references denote similar items.

FIG. 1 is the block diagram of an assistance device according to the invention.

Figure 2:
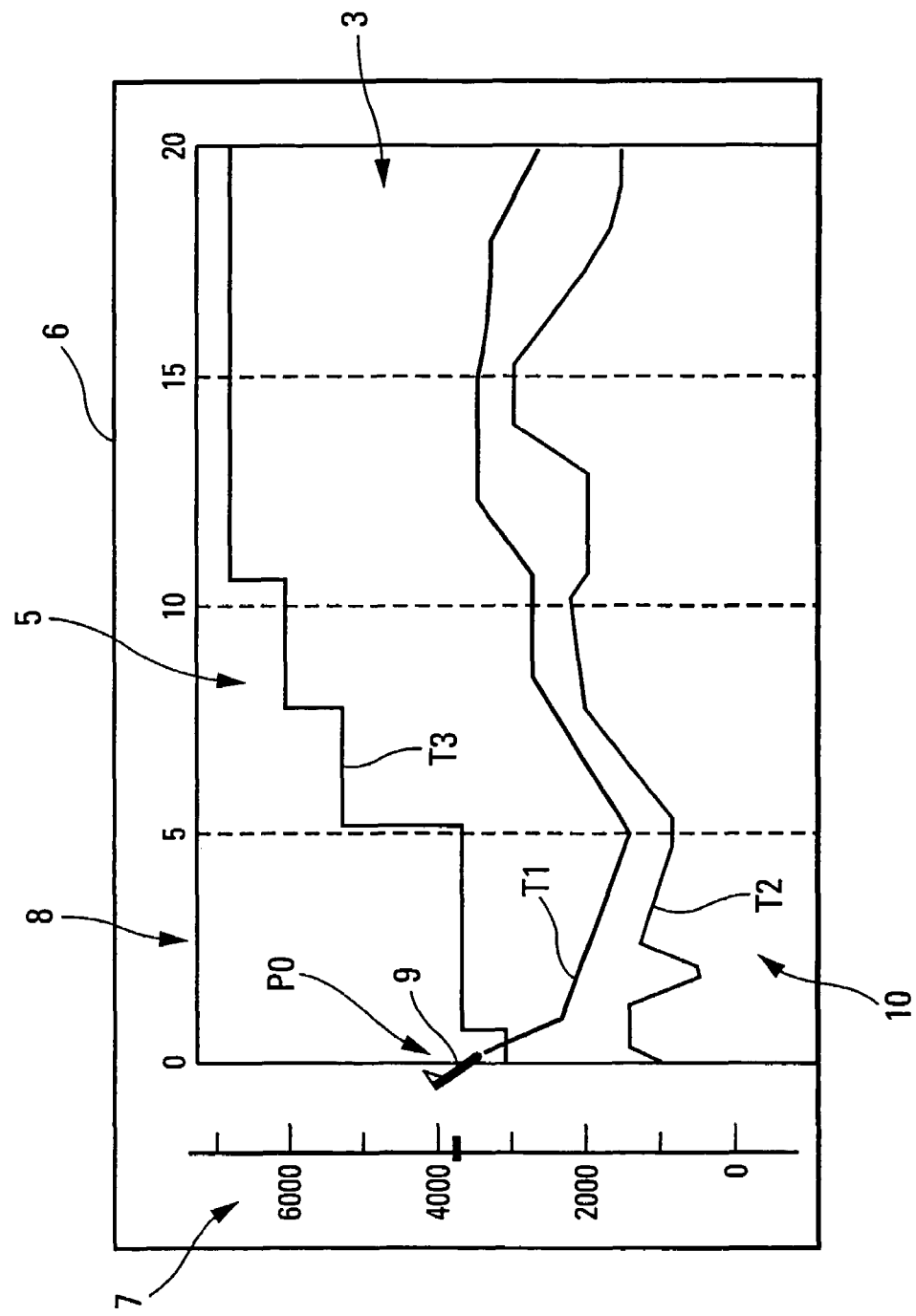

FIG. 2 diagrammatically shows a display window of an assistance device according to the invention.

Figure 3:
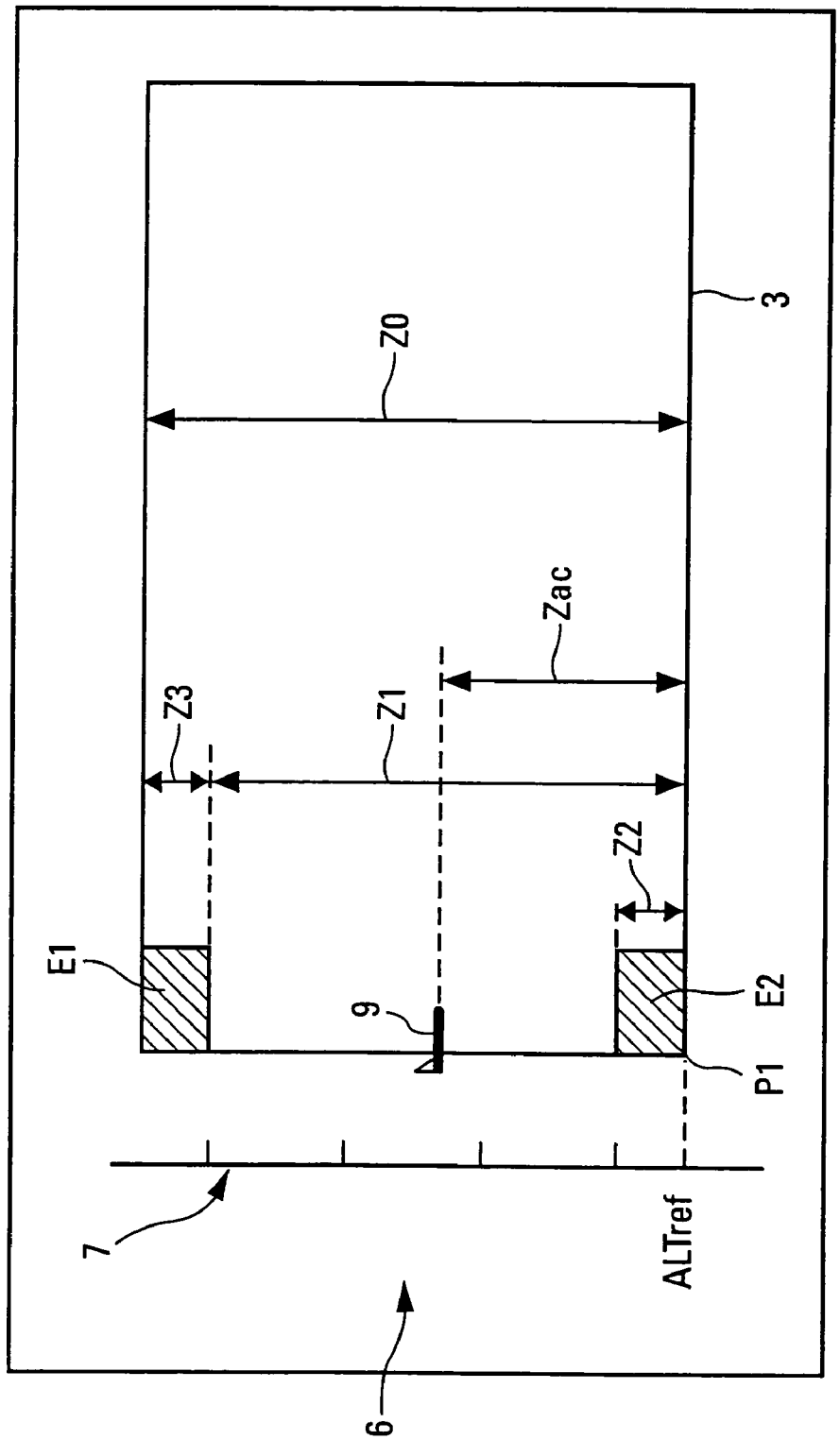

FIG. 3 diagrammatically illustrates a display window, on which are shown various parameters used to implement the present invention.

DETAILED DESCRIPTION OF THE INVENTION

The device 1 according to the invention and diagrammatically represented in FIG. 1 is intended to assist operators (pilot, co-pilot, etc.) of an aircraft (not shown), in the piloting of said aircraft, for example a military transport airplane. Within the context of the present invention, said aircraft is guided along a flight path which conforms to a predetermined flight plan.

For this, said assistance device 1 which is on board the aircraft, comprises display means 2 which can show, on a display window 3 of a usual display screen 4, an information presentation 5 detailed below. Said display window 3 can be represented on a part 6 of the display screen 4, for example a lower part of the latter. It can also be represented over all of said display screen 4.

Said information presentation 5 illustrates a vertical plane along the flight path of the aircraft and comprises, as represented in FIG. 2:

a system of axes, of which a y-axis 7 is graduated altitude-wise, preferably expressed in feet (a foot being approximately 0.3 meters), and an x-axis 8 is graduated distance-wise from the position of the aircraft illustrated by a characteristic symbol 9, said distance preferably being expressed in nautical miles NM (a nautical mile being approximately 1852 meters);

said characteristic symbol 9 which represents the aircraft and which is placed on said y-axis 7 in a position P0 representative of the altitude of said aircraft;

a trace T1 representing the vertical path of said flight path in accordance with the flight plan followed. This flight path usually includes said vertical path defined in the vertical plane and a lateral path defined in the horizontal plane;

a trace T2 representing the profile of the ground being flown over and revealing a vertical section 10; and optionally a trace T3 illustrating a safety altitude.

In the examples shown in FIG. 2, the aircraft A follows a low-altitude flight path, which lies beneath the safety altitude and is intended, by definition, to follow as close as possible to ground being flown over.

Said device 1 can also include a set 12 of information sources, which is linked via a link 13 to said display means 2. Said set 12 of information sources can in particular comprise the following means which are not detailed any further:

a central acquisition and information processing unit, for example a flight management system (FMS); and usual information sources such as navigation instruments and sensors giving information on the state and position of the aircraft for example.

It will be noted that the device 1 according to the invention can be used more particularly, although not exclusively, in a tactical flight, that is, in a flight that is normally implemented in the military field and which includes at least one tactical event such as an in-flight refueling, an initially unplanned landing, a jettisoning or a parachuting of troops and/or equipment for example. Such a tactical flight has a profile which, overall, can include several high-altitude flight phases and several low-altitude flight phases.

Also, the device 1 according to the invention which is intended for a tactical flight must be optimized not only for long climb and descent phases, but also for automatic ground-following paths leading to climbs and descents, in the phases connecting a descent and a low-altitude flight and connecting a low-altitude flight and a climb.

In order to be able in particular to be used in such a tactical flight which can include several short high-altitude flight phases and low-altitude flight phases, said device 1 comprises, in addition, according to the invention:

a usual means 14, for determining the current flight phase (climbing phase, cruising phase, low-altitude flight phase, etc.) of the aircraft;

a usual means 15, for determining an altitude ALTac corresponding to the current altitude of the aircraft;

a means 16 for calculating an altitude ALTmoy corresponding to the average value of the altitude of a portion of said flight path, said portion starting at the current position of the aircraft and corresponding to the maximum portion that can be displayed in said display window 3 as a function of the size and the scale of said display window; and a means 17 which is linked via links 18, 19, 20 and 21 respectively to said means 2, 14, 15 and 16, and which is formed so as to determine, from said current flight phase and from said altitudes ALTac and ALTmoy, in the manner specified below:

a reference height Zac (which corresponds to a height of said characteristic symbol 9 in said display window 3); and a reference altitude ALTref (which corresponds to the altitude of the lowest point of the vertical section 10 displayed).

Furthermore, according to the invention, said display means 2 are formed so as to position, as represented in FIG. 3:

said display window 3 altitude-wise such that the lowest point P1 of the vertical section 10 displayed in said display window 3 is located at said reference altitude ALTref (calculated by said means 17) on said y-axis 7 graduated altitude-wise; and said characteristic symbol 9 vertically in said display window 3 in order to bring it in said display window 3 to a height corresponding to said reference height Zac (calculated by said means 17).

Thus, with the device 1 according to the invention, the positioning altitude-wise of the display window 3, and the positioning of the characteristic symbol 9 in this display window 3, depend on the current flight phase, and on said altitudes ALTac and ALTmoy. Consequently, as explained below, said information presentation 5 always shows the space that is located in the direction in which the aircraft is flying, which has the particular advantage of never losing the monitoring of the ground in transitional phases, between a climb and a descent for example. This characteristic makes it possible to optimize the monitoring of the future flight path, and this regardless of the flight phase of the aircraft. Furthermore, the transitions from one phase to another are continuous, without any jump in position of the display window 3, or (above all) of said characteristic symbol 9.

In a particular embodiment, said means 14 and 15 can be incorporated in said set 12 of information sources and said means 16 and 17 can be part of said display means 2.

To clearly explain the characteristics of the present invention, account is taken of the following heights, relative to the display window 3, which are represented in FIG. 3:

Z0 which is the useful height of the display window 3, that is, the overall height of the part of the space (ground and sky) displayed in this display window 3;

Z1 which corresponds to the difference between said useful height Z0 and the height Z3 of an upper area E1 of display exclusion, in which said characteristic symbol 9 cannot be displayed. Preferably, the height Z3 is equal to Z0/8 such that the height Z1 is then equal to 7Z0/8; and Z2 which is the height of a lower area E2 of display exclusion, in which said characteristic symbol 9 cannot be displayed. Preferably, the height Z2 is equal to Z0/8.

In a preferred embodiment, in a flight phase corresponding to one of the following phases: an approach phase, a go-around phase and a low-altitude flight phase, said means 17:

A) compares, between them, said altitudes ALTac and ALTmoy received from said means 14 and 15; and B) depending on this comparison:
if said altitude ALTac is greater than said altitude ALTmoy, determines:
as reference height Zac, the minimum value between Z1 and Z0/2+C(ALTac−ALTmoy), C being a coefficient specified below; and
as reference altitude ALTref:
an altitude satisfying the relation ALTref=ALTmoy−Z0/2, if ALTac−ALTmoy is less than a predetermined value, preferably 3Z0/8; and
an altitude satisfying the relation ALTref=ALTac−Z1, if ALTac-ALTmoy is greater than or equal to said predetermined value;
if said altitude ALTac is less than or equal to said altitude ALTmoy, determines:
as reference height Zac, the maximum value between Z2 and Z0/2−C(ALTmoy−ALTac); and
as reference altitude ALTref:
an altitude satisfying the relation ALTref=ALTmoy−Z0/2, if ALTac−ALTmoy is less than the aforementioned predetermined value, preferably 3Z0/8; and
an altitude satisfying the relation ALTref=ALTac−Z2, if ALTac−ALTmoy is greater than or equal to said predetermined value.

In this preferred embodiment, in a first simplified variation, said coefficient C is equal to 1. This makes it possible to obtain a very simple method of calculation.

Furthermore, in a second variant, said coefficient C is different than 1. Thus, the characteristic symbol 9 is offset by a value proportional to the difference between said altitudes ALTac and ALTmoy. If C is less than 1, the positional variations of said characteristic symbol 9 are smoothed out so that these positional variations are less rapid, especially during the transition from stable phases (such as a cruise phase, or a low-altitude flight with little relief) to prolonged descent or climb phases. However, if C is greater than 1, these positional variations are rendered more reactive to the path variations.

Moreover, in a flight phase corresponding to one of the following phases: a take-off phase, a climbing phase and a pre-flight phase, said means 17 determines:
as reference height Zac, said height Z2; and
as reference altitude ALTref, an altitude satisfying the relation ALTref=ALTac−Z2.

Furthermore, in a flight phase corresponding to a descent phase, said means 17 determines:
as reference height Zac, said height Z1 which corresponds to the difference between the useful height Z0 of the display window 3 and the height Z3 of the upper area E1 of display exclusion; and
as reference altitude ALTref, an altitude satisfying the relation ALTref=ALTac−Z1.

Consequently, the device 1 according to the invention makes it possible to avoid any discontinuity in the position of said characteristic symbol 9 and in that of said display window 3. In addition, it makes it possible to optimize the length of the flight path (for example at low altitude) which can be displayed before leaving said display window 3.

The invention claimed is:

1. A method of assisting in piloting of an aircraft, wherein there is presented, on at least one display window of at least one display screen of said aircraft, an information presentation which illustrates a vertical plane along a flight path which is representative of a predetermined flight plan of said aircraft and which comprises:
a system of axes, of which a y-axis is graduated altitude-wise, and an x-axis is graduated distance-wise from a position of the aircraft;
a characteristic symbol representing the aircraft, which is positioned on said y-axis in a position representative of an altitude of said aircraft;
a first trace representing a vertical path of said flight path; and
a second trace representing a profile of the ground being flown over and revealing a vertical section,
wherein, during a flight of the aircraft, the following series of successive steps is carried out automatically and repeatedly:
a) determining a current flight phase of the aircraft;
b) determining a first altitude ALTac corresponding to a current altitude of the aircraft;
c) calculating a second altitude ALTmoy corresponding to an average value of the altitude of a portion of said flight path, said portion starting at a current position of the aircraft and corresponding to a maximum portion that can be displayed in said display window as a function of the size of said display window and of its scale;
d) determining, based on said current flight phase and said first altitude ALTac and said second altitudes ALTmoy:
a reference height Zac corresponding to a height of said characteristic symbol in said display window; and
a reference altitude ALTref corresponding to an altitude of a lowest point of the vertical section displayed; and
e) positioning:
said display window, altitude-wise such that the lowest point of the vertical section displayed in said display window is located at said reference altitude ALTref on said y-axis graduated altitude-wise; and
said characteristic symbol, vertically in said display window at a height corresponding to said reference height Zac, wherein the aircraft is guided along the flight path which conforms to the predetermined flight plan.

2. The method as claimed in claim 1, wherein, in a flight phase corresponding to one of the following phases: an approach phase, a go-around phase, and a low-altitude flight phase, step d) comprises:
d1) comparing said first altitude ALTac and said second altitudes ALTmoy; and
d2) as a function of this comparison:
if said first altitude ALTac is greater than said second altitude ALTmoy, determining:
the reference height Zac, having a minimum value between Z1 and Z0/2+C(ALTac-ALTmoy), Z0 being a useful height of the display window, Z1 being a difference between said useful height and a height Z3 of an upper area of exclusion from display of said characteristic symbol in said display window, and C being a coefficient; and the reference altitude $ALT_{ref}$:
- having an altitude satisfying the relation $ALT_{ref}=ALT_{moy}-Z0/2$, if $ALT_{ac}-ALT_{moy}$ is less than a predetermined value; and
- having an altitude satisfying the relation $ALT_{ref}=ALT_{ac}-Z1$, if $ALT_{ac}-ALT_{moy}$ is greater than or equal to said predetermined value;

if said first altitude $ALT_{ac}$ is less than or equal to said second altitude $ALT_{moy}$, determining:
- the reference height $Z_{ac}$, having a maximum value between $Z2$ and $Z0/2C$ ($ALT_{moy}-ALT_{ac}$), $Z2$ being the height of a lower area of exclusion from display of said characteristic symbol in said display window (3); and
- the reference altitude $ALT_{ref}$:
  - having an altitude satisfying the relation $ALT_{ref}=ALT_{moy}-Z0/2$, if $ALT_{ac}-ALT_{moy}$ is less than said predetermined value; and
  - having an altitude satisfying the relation $ALT_{ref}=ALT_{ac}-Z2$, if $ALT_{ac}-ALT_{moy}$ is greater than or equal to said predetermined value.

3. The method as claimed in claim 2, wherein said coefficient C is equal to 1.

4. The method as claimed in claim 2, wherein said coefficient C is other than 1.

5. The method as claimed in claim 1, wherein, in a flight phase corresponding to one of the following phases: a take-off phase, a climbing phase and a pre-flight phase, step d) comprises determining:
- the reference height $Z_{ac}$, having a height $Z2$ which corresponds to a height of a lower area of exclusion from display of said characteristic symbol in said display window; and
- the reference altitude $ALT_{ref}$, having an altitude satisfying the relation $ALT_{ref}=ALT_{ac}-Z2$, $ALT_{ac}$ being said first altitude.

6. The method as claimed in claim 1, wherein, in a flight phase corresponding to a descent phase, step d) comprises determining:
- the reference height $Z_{ac}$;
- a difference between a useful height of the display window and a height of an upper area of exclusion from display of said characteristic symbol in said display window; and
- the reference altitude $ALT_{ref}$, having an altitude satisfying the relation $ALT_{ref}=ALT_{ac}-Z1$, $ALT_{ac}$ being said first altitude.

7. An aircraft, which comprises a device which can implement the method specified in claim 1.

8. A device to assist in piloting of an aircraft, said device comprising a display unit to show, on at least one display window of at least one display screen of said aircraft, an information presentation which illustrates a vertical plane along a flight path which is representative of a predetermined flight plan of said aircraft and which comprises:
- a system of axes, of which a y-axis is graduated altitude-wise, and an x-axis is graduated distance-wise from a position of the aircraft;
- a characteristic symbol representing the aircraft, which is placed on said y-axis in a position representative of an altitude of said aircraft;
- a first trace representing a vertical path of said flight path; and
- a second trace representing a profile of the ground being flown over and revealing a vertical section, wherein: said device also comprises:
- a first determining unit to determine a current flight phase of the aircraft;
- a second determining unit that determines a first altitude $ALT_{ac}$ corresponding to a current altitude of the aircraft;
- a third determining unit that determines a second altitude corresponding to an average value of an altitude of a portion of said flight path, said portion starting at the current position of the aircraft and corresponding to a maximum portion that can be displayed in said display window as a function of a size of said display window and of its scale; and
- a fourth determining unit that determines, from said current flight phase and said first altitude $ALT_{ac}$ and said second altitudes $ALT_{moy}$:
- a reference height $Z_{ac}$ corresponding to a height of said characteristic symbol in said display window; and
- a reference altitude $ALT_{ref}$ corresponding to an altitude of a lowest point of the vertical section displayed; and
- said display unit is formed so as to position:
- said display window altitude-wise such that a lowest point of the vertical section displayed in said display window is located at said reference altitude $ALT_{ref}$ on said y-axis graduated altitude-wise; and
- said characteristic symbol vertically in said display window at a height corresponding to said reference height $Z_{ac}$, wherein the aircraft is guided along the flight path which conforms to the predetermined flight plan.

9. An aircraft, which comprises the device that specified under claim 8.

* * * * *